May 5, 1970
J. L. REIMERS
3,510,320
HEAT TREATMENT APPARATUS
Filed Aug. 14, 1967
12 Sheets-Sheet 1
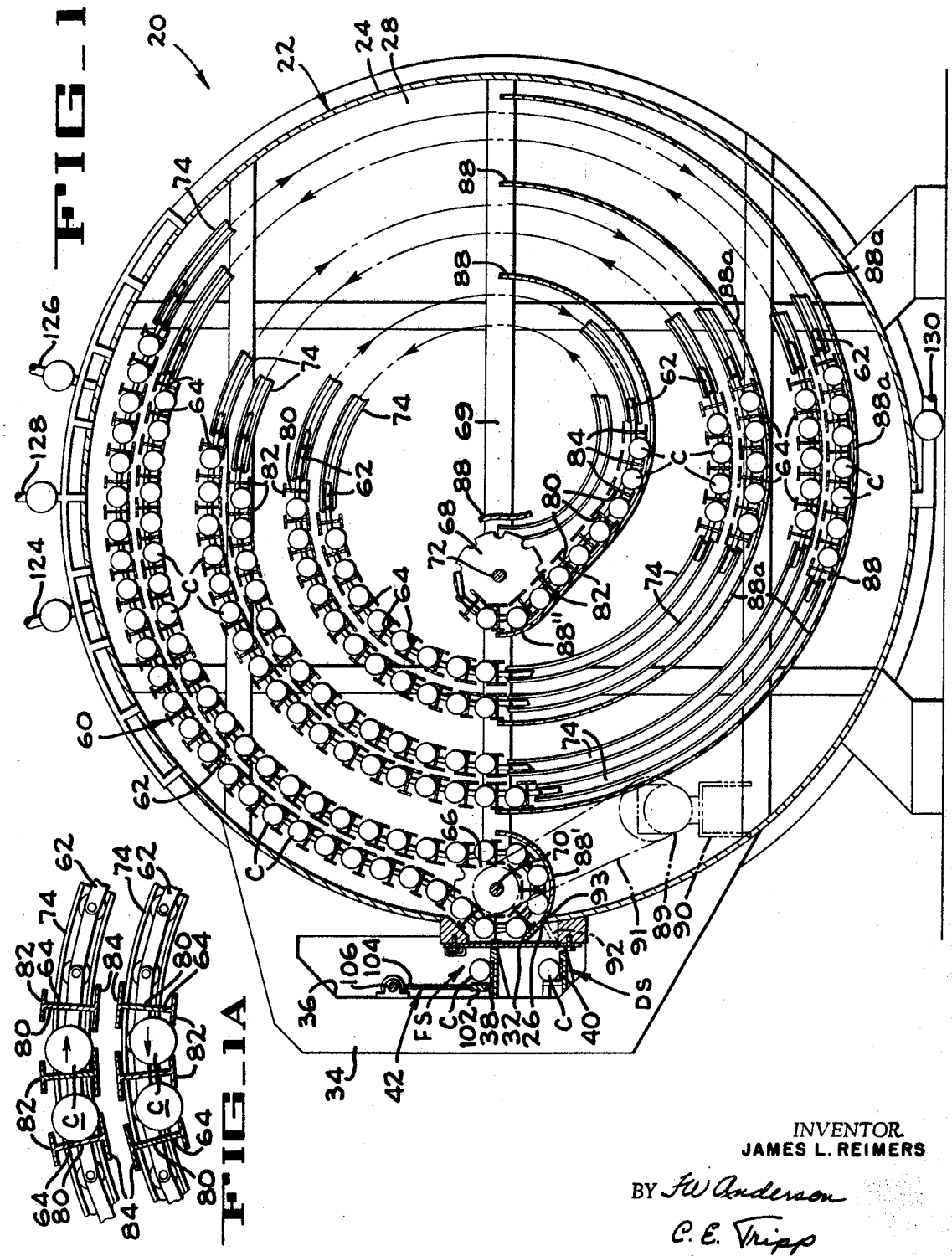
INVENTOR.
JAMES L. REIMERS
BY JW Anderson
C.E. Tripp
ATTORNEYS

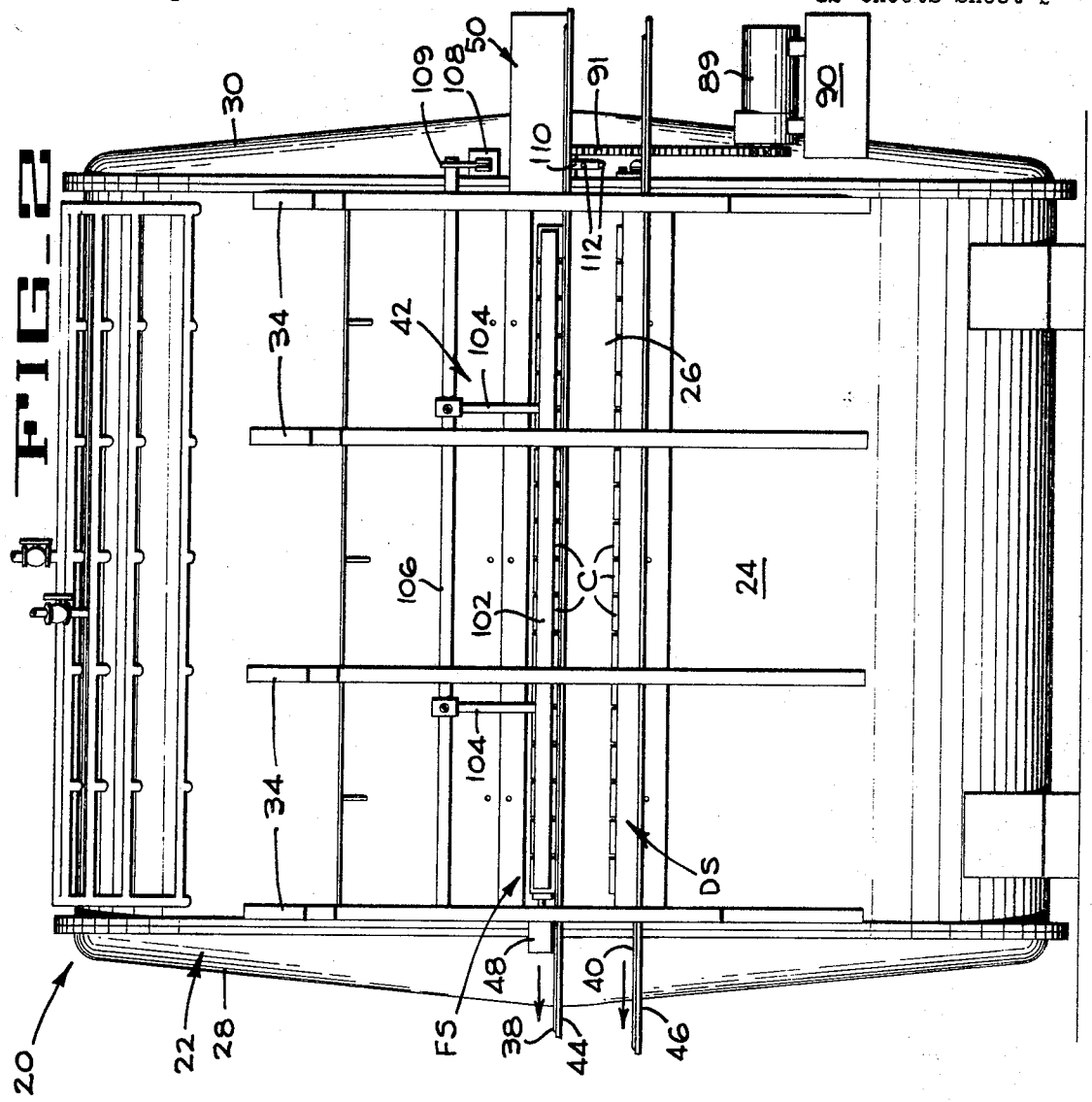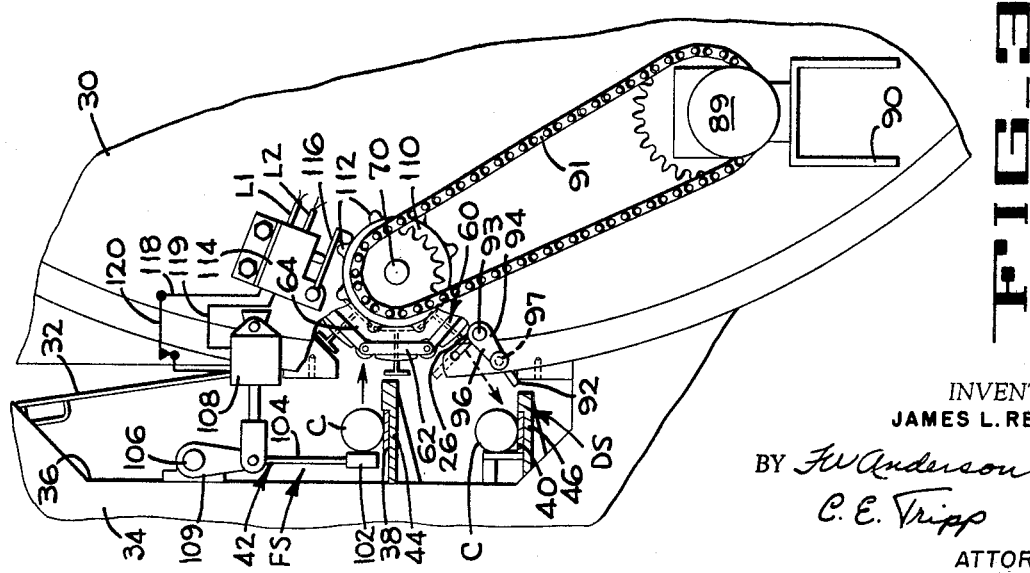

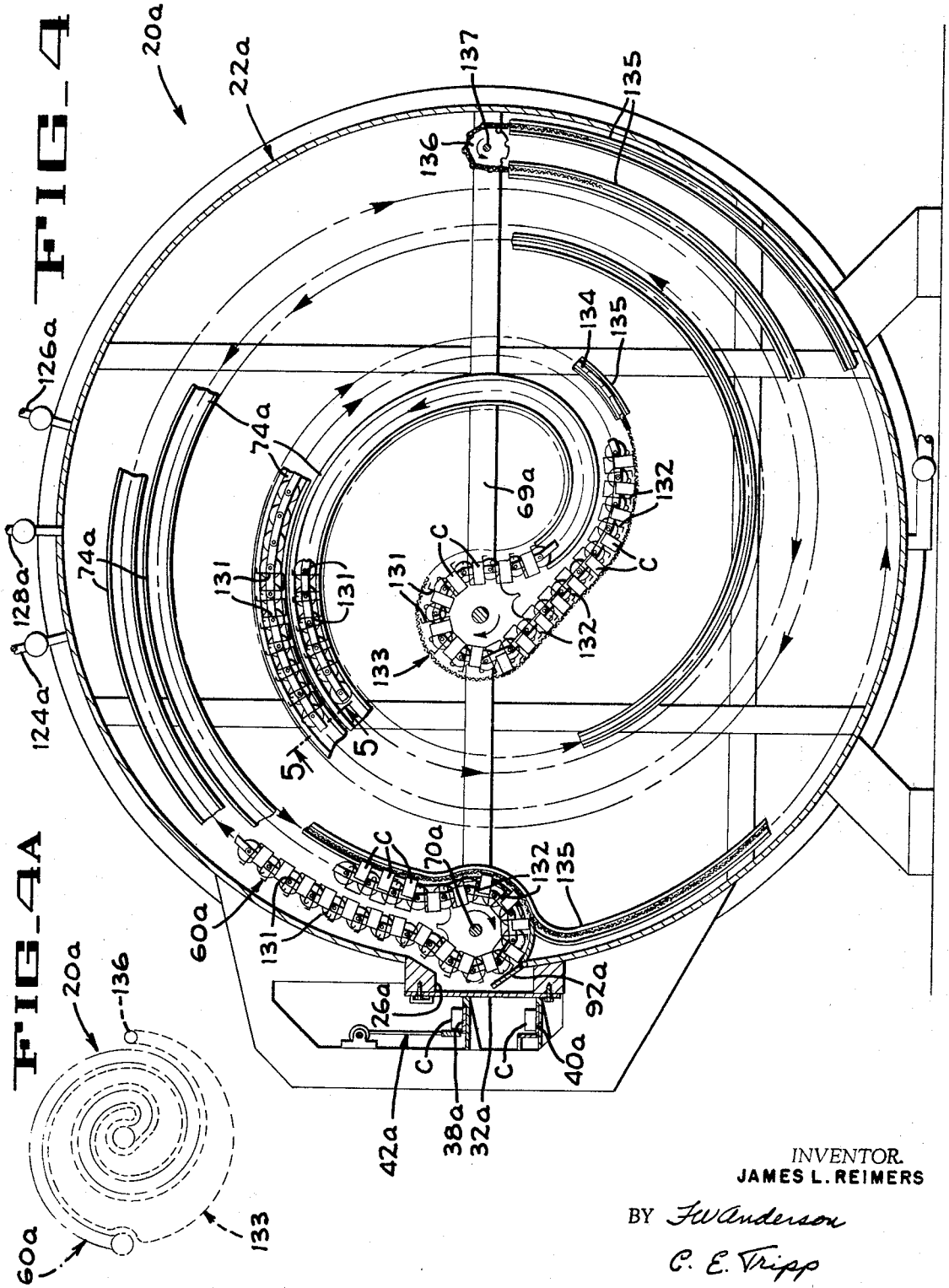

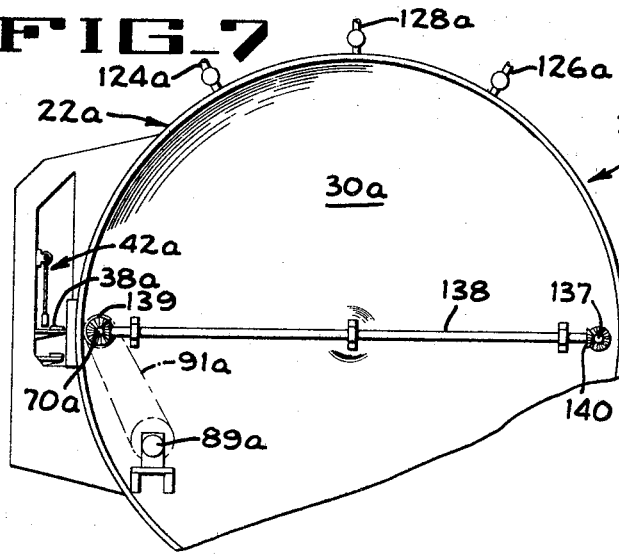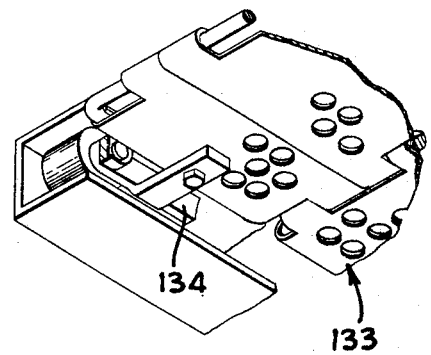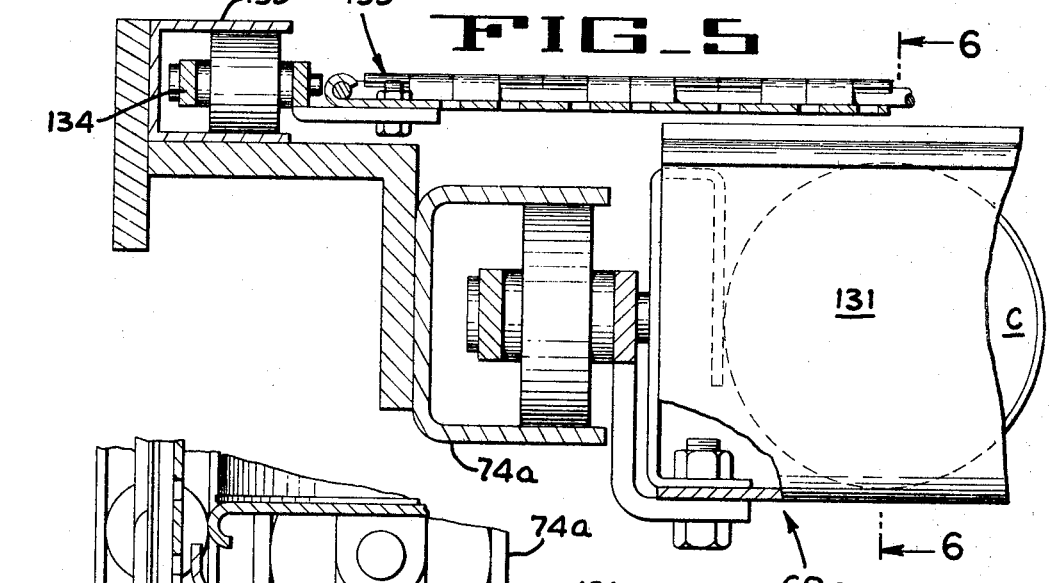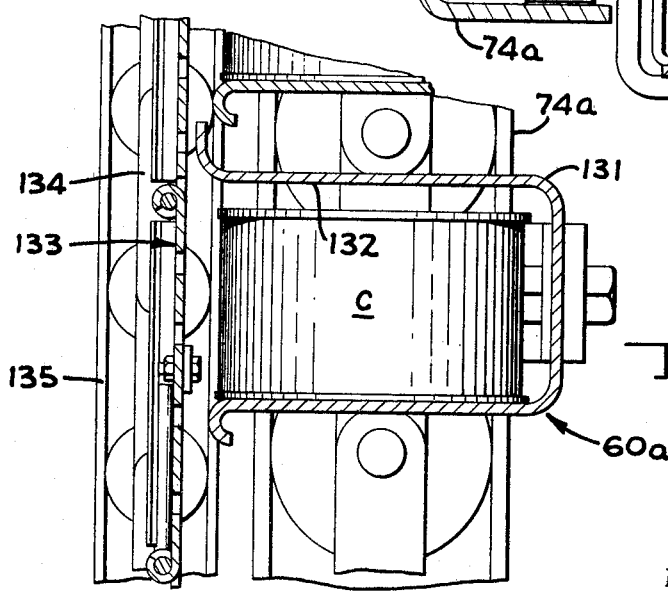

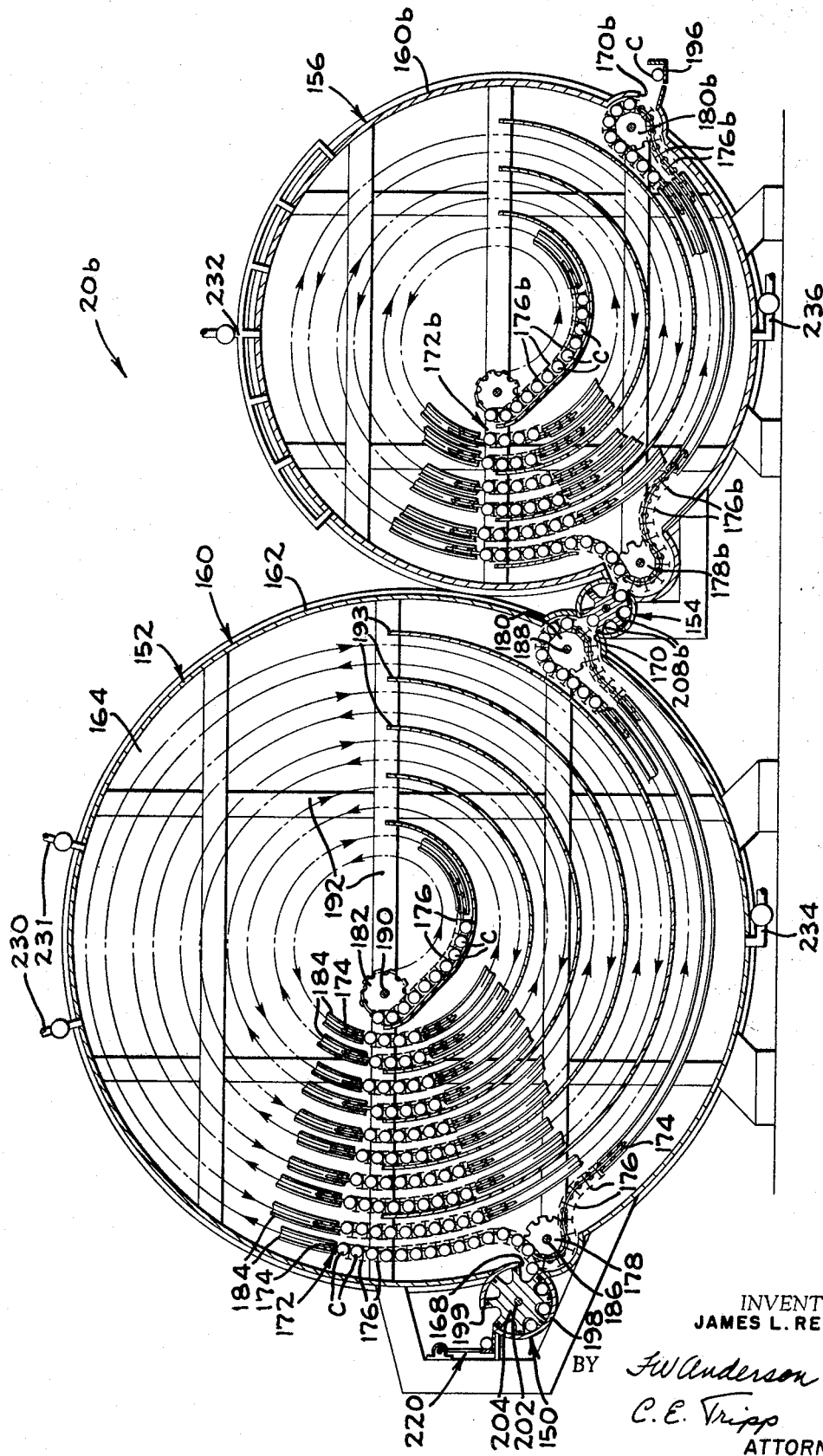

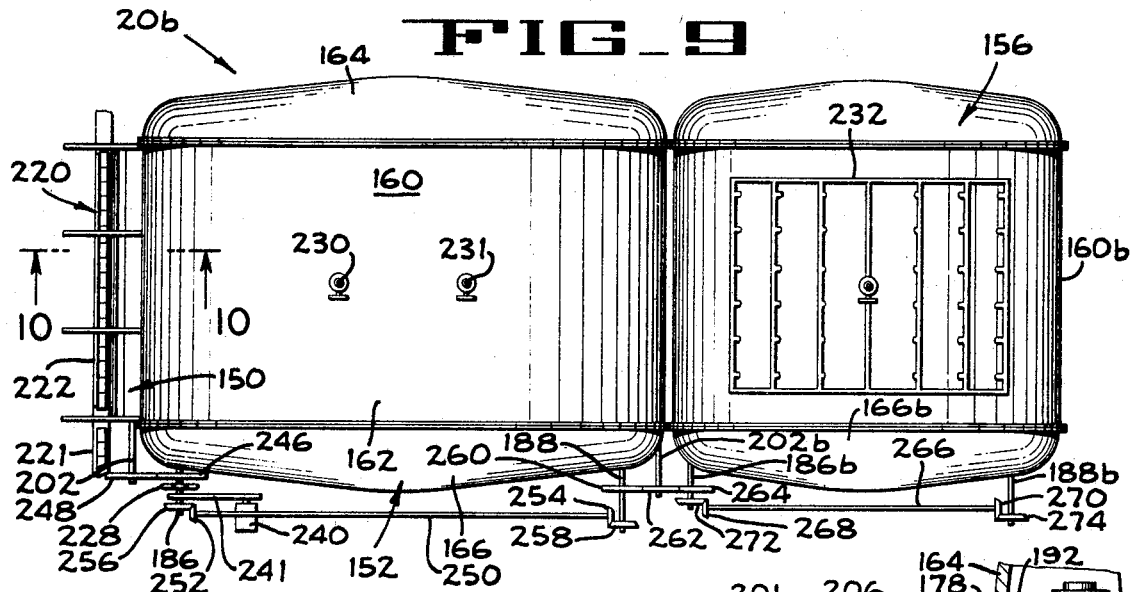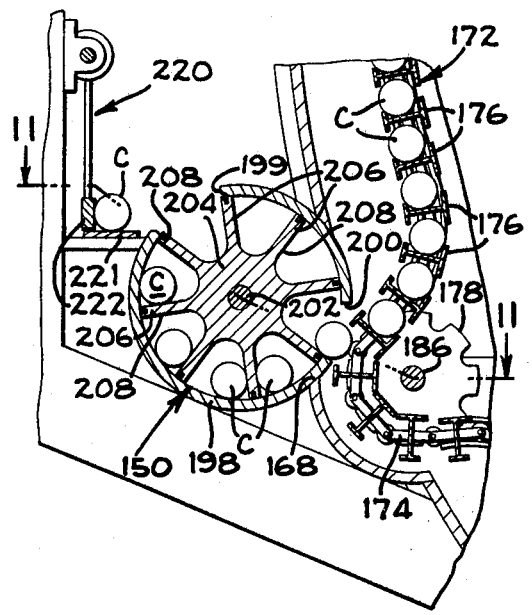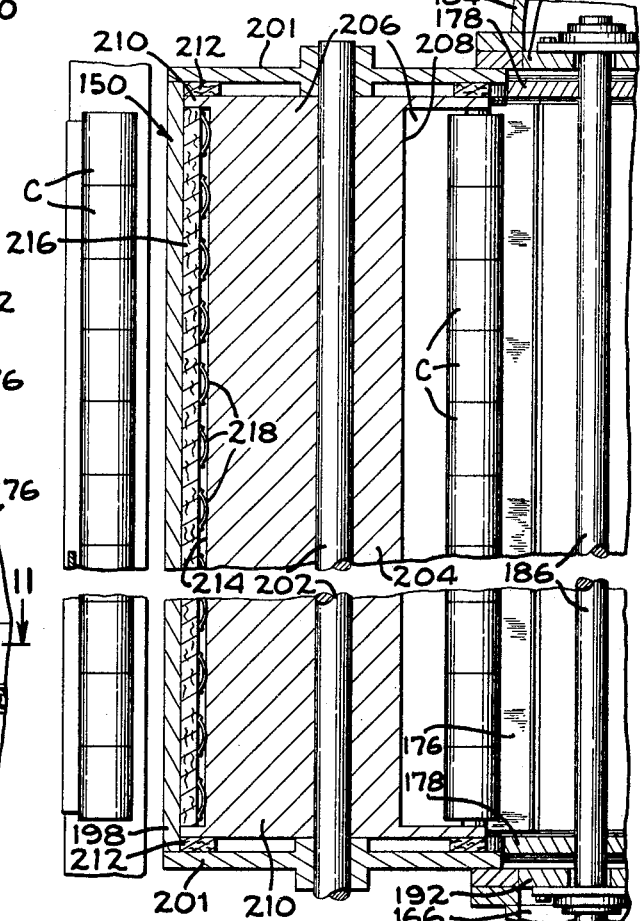

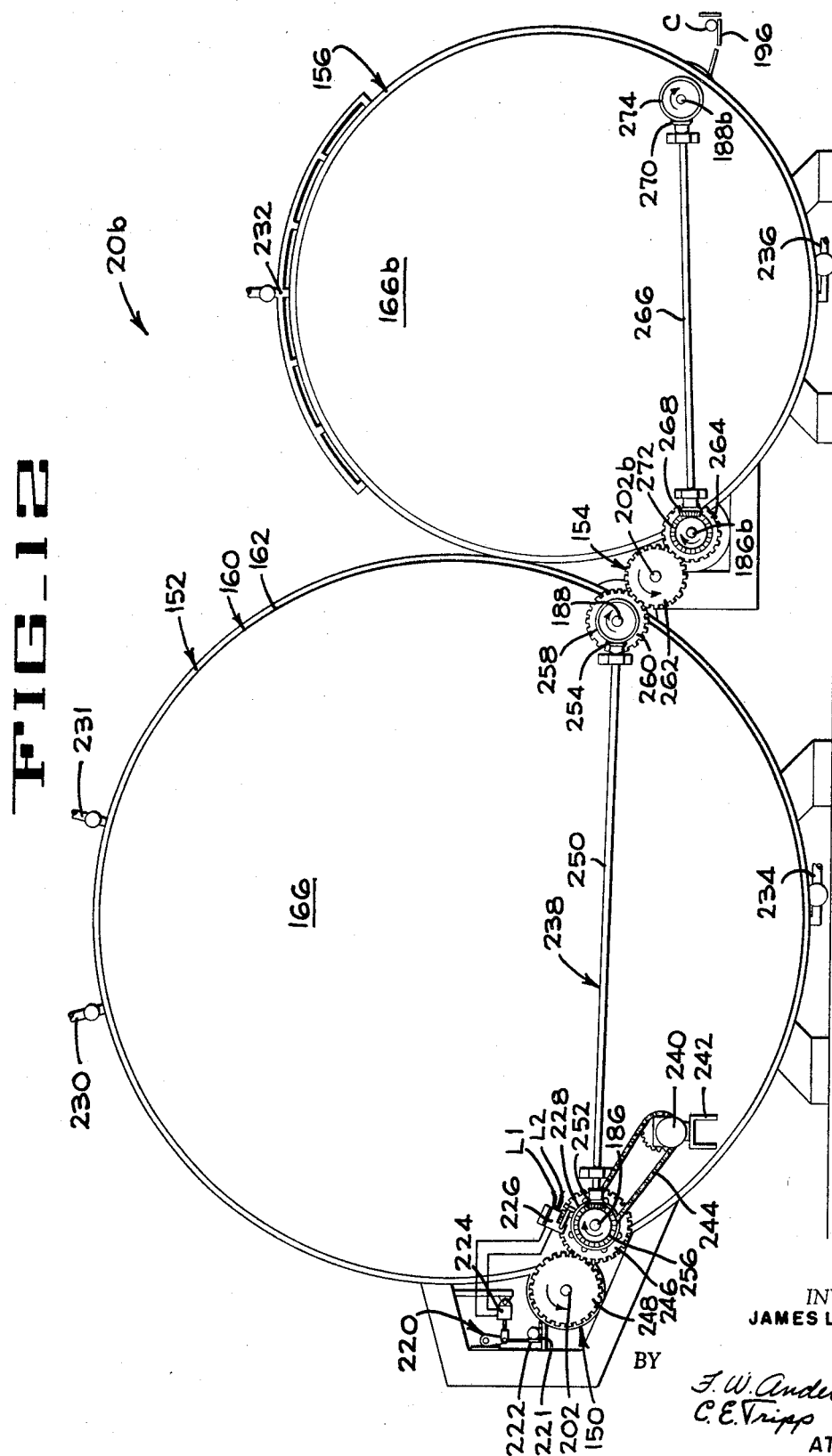
FIG_12

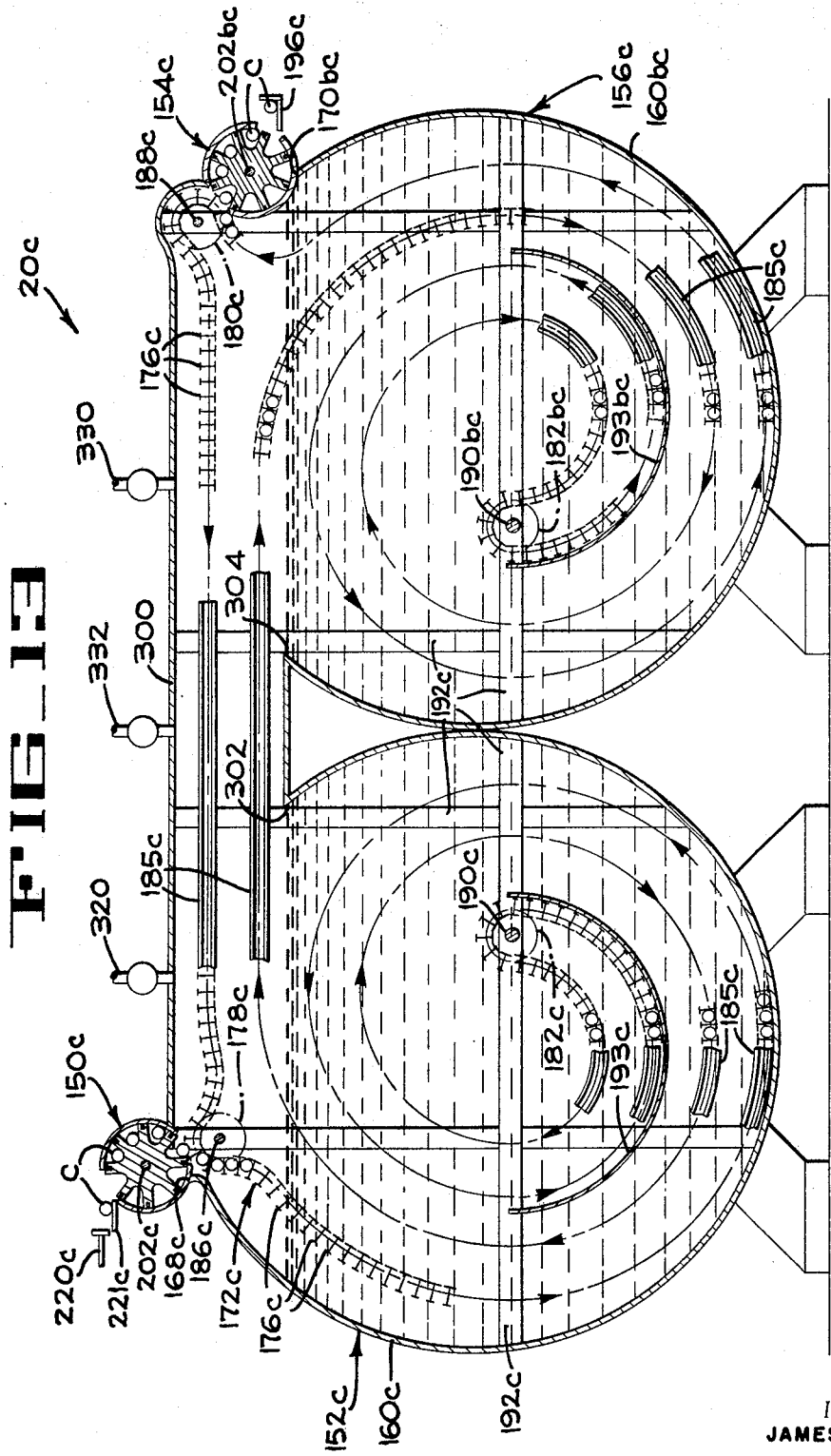

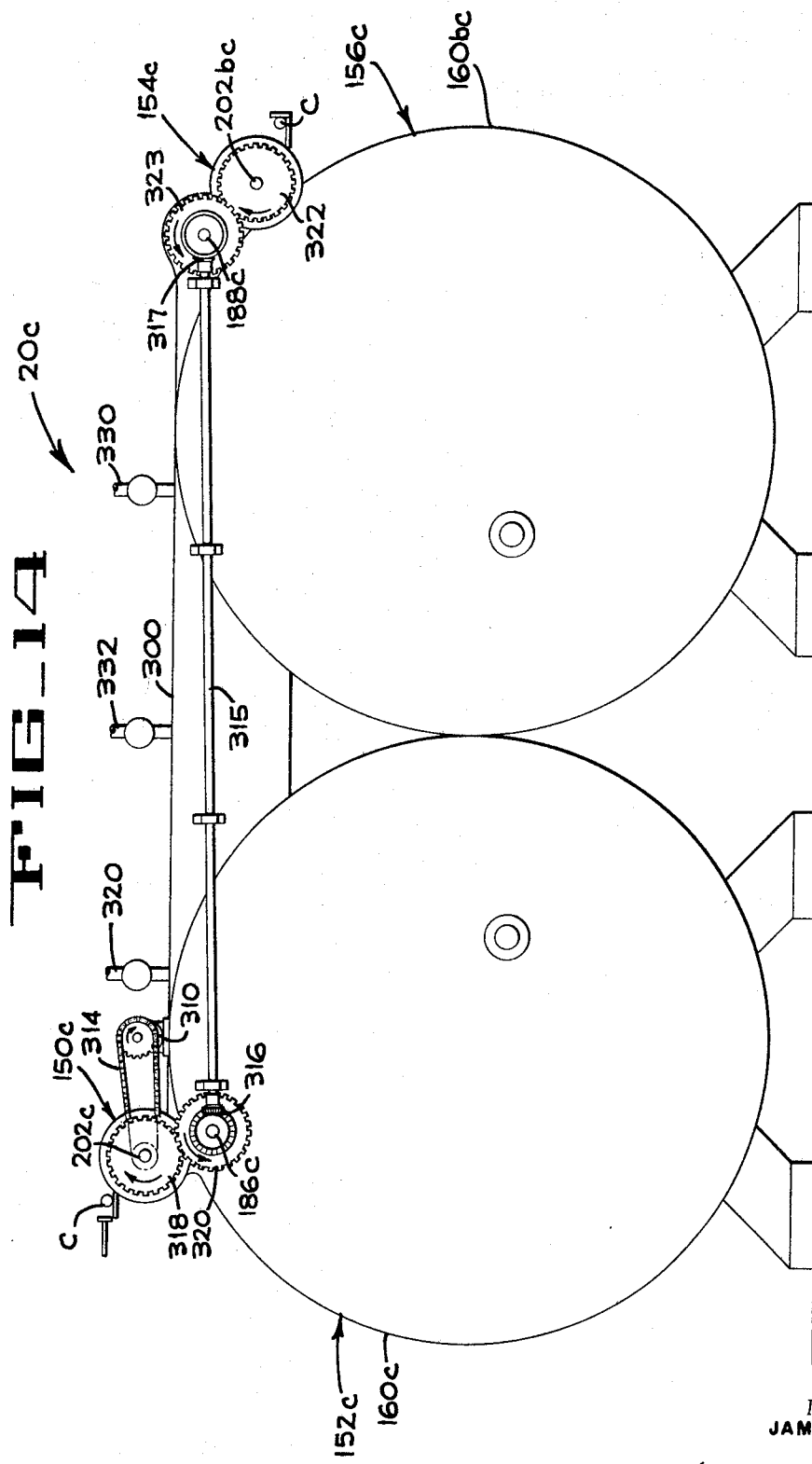

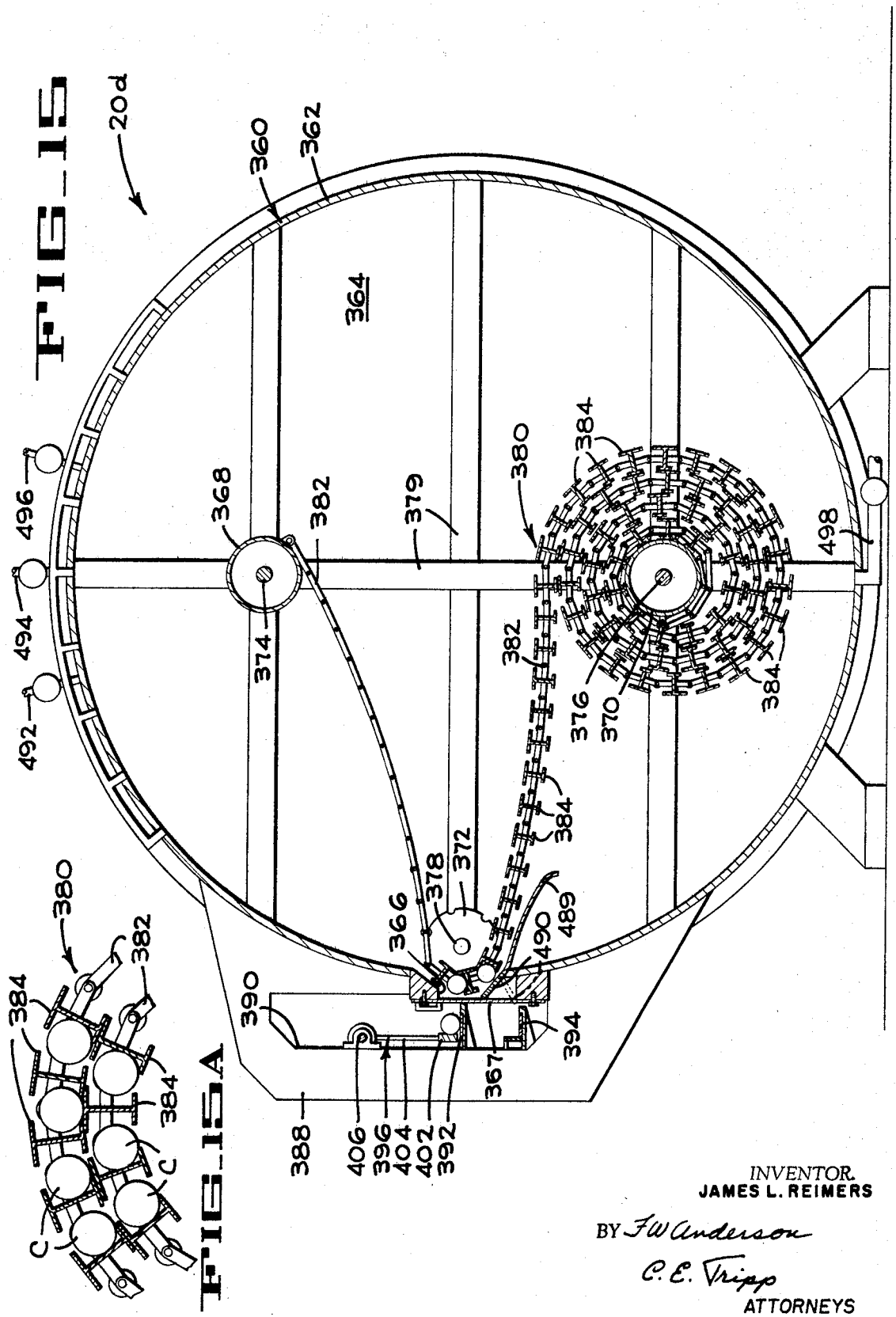

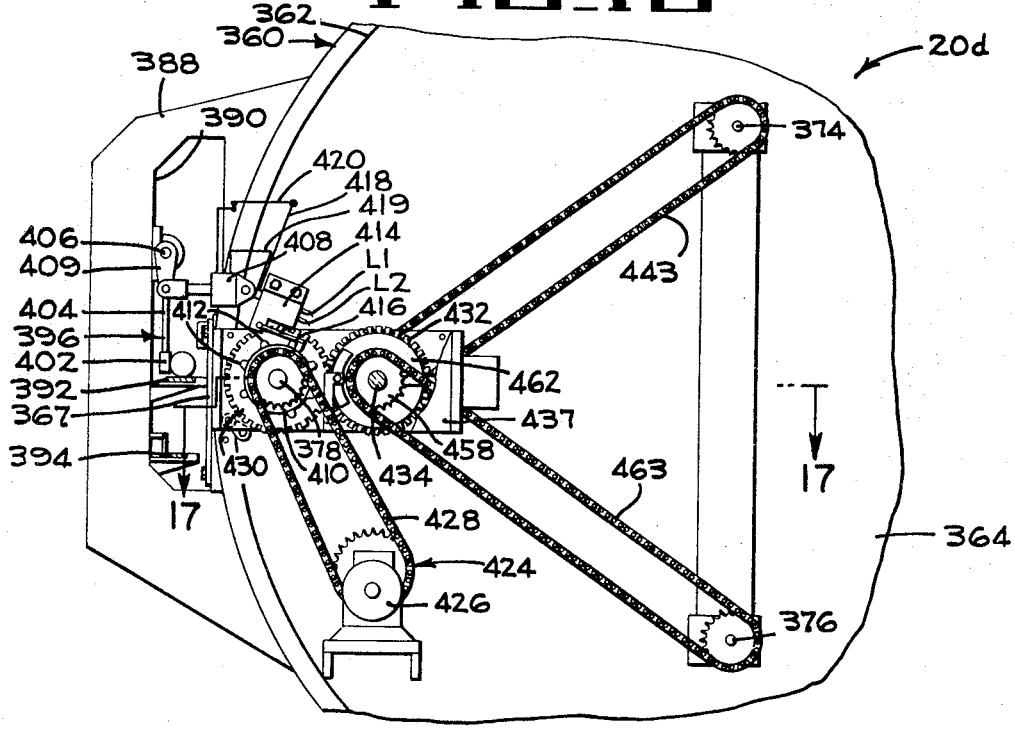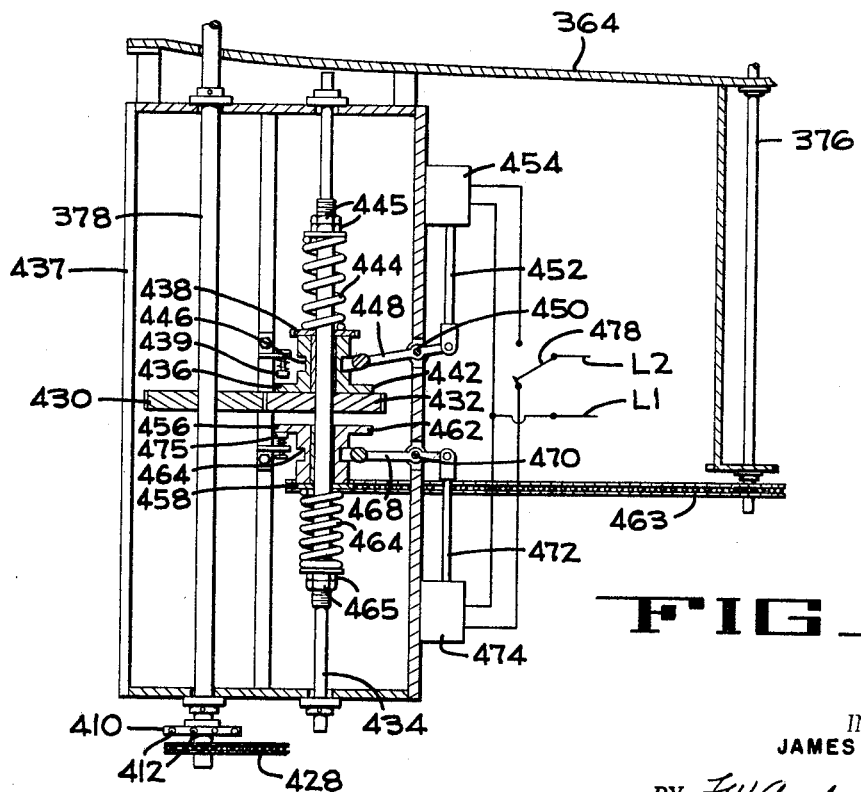

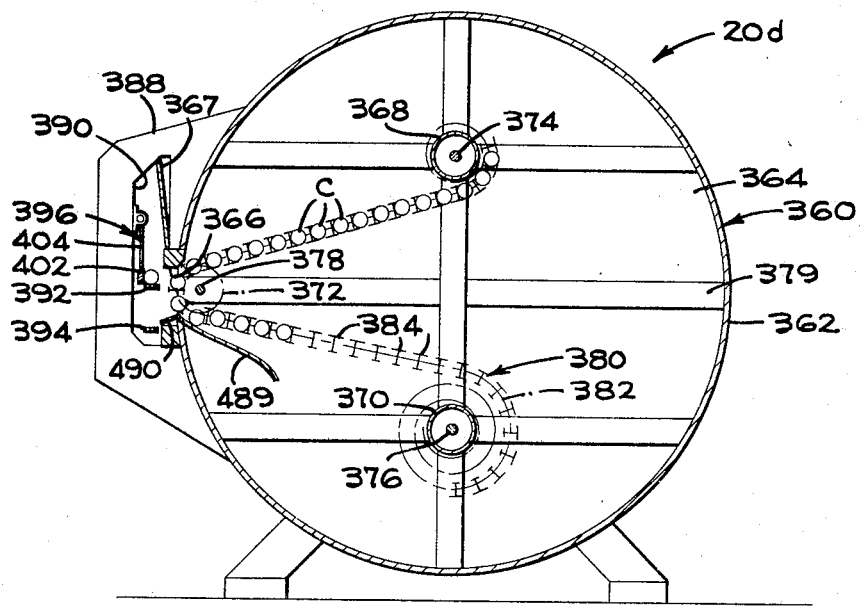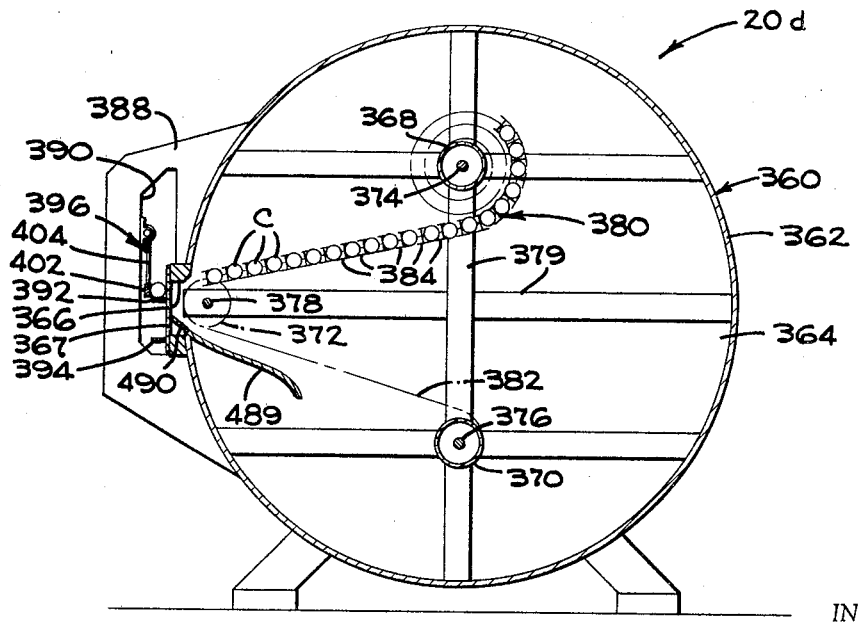

United States Patent Office 3,510,320
Patented May 5, 1970

3,510,320
HEAT TREATMENT APPARATUS
James L. Reimers, San Jose, Calif., assignor to FMC Corporation, San Jose, Calif., a corporation of Delaware
Filed Aug. 14, 1967, Ser. No. 660,281
Int. Cl. A23l 3/00
U.S. Cl. 99—365                    21 Claims

ABSTRACT OF THE DISCLOSURE

A cooking and cooling apparatus having at least one housing with closed end walls and at least one elongated slot in the cylindrical wall to permit passage of rows of containers therethrough. Conveyor supporting means are provided in the housing for supporting a conveyor so that a portion of the conveyor will assume a spiral configuration in the housing. Closure means are selectively moved between closed and open positions so that the rows of containers can be fed into the housing, be processed under superatmospheric conditions, and then be discharged from the housing.

BACKGROUND OF THE INVENTION

This invention pertains to inexpensive, high capacity cooking and cooling units which are suitable for use by small canners who cannot justify the expense of the larger and more complicated hydrostatic cookers or the reel and spiral type cookers, both of which are well known to the canning industry. Many of the smaller canners at the present time rely greatly on batch type retort cookers, which cookers have little control over the containers being processed resulting in an excessive number of dents if cans are being processed or an excesive amount of breakage if the containers being processed are glass jars.

The apparatus of the present invention is also intended to combine the advantages of the hydrostatic type cookers with the advantages of the reel and spiral type cookers, while doing away with the disadvantages of both of these cookers.

One disadvantage of the hydrostatic type cookers is that they are quite large and have water filled chambers which are about sixty feet tall. Accordingly, these cookers require special building to house the cooker as well as massive concrete foundations to support the same. One of the important advantages of hydrostatic cookers is that they include wide processing conveyors having container supporting carriers which cooperate to confine rows of containers therebetween, which rows are about seven feet long. Thus, even though the processing conveyor of a hydrostatic cooker moves quite slowly, the cooker handles a very large number of cans per minute.

The primary disadvantage of the well known reel and spiral type pressure cooker for high capacity operation is that the containers are fed and discharged from the cookers one at a time, and that each container must move axially of the cooker from one end to the other during processing. Thus, in order to obtain high capacity operation, each container is moved quite rapidly through the machine and is subjected to considerable frictional wear. Another disadvantage of the reel and spiral type cooker is that the holding capacity of the cylindrical cooker housing is not used to full advantage since the containers being processed are retained as a single layer in an annular area immediately adjacent the periphery of the cooker housing. Some advantages of the reel and spiral type cookers are that they require only a relatively small floor space, do not require expensive foundations or buildings, and that their cylindrical housings are ideally suited to resist internal pressures without requiring excessive and costly bracing.

SUMMARY OF THE INVENTION

The heat treatment apparatus of the present invention utilizes the advantages of the two above mentioned types of cookers and avoids the disadvantages of these cookers. The apparatus utilizes a cylindrical pressure resisting housing having a wide hydrostatic cooker type processing conveyor spirally wound therein so as to more fully utilize the holding capacity of the housing. The conveyor includes a plurality of cooperating container supporting carriers which receive and confine rows of containers therein, as opposed to handling containers received one at a time. The apparatus may either be of the batch type wherein the cooking and cooling is done in a single shell, or the apparatus may be of the continuous type wherein the cooking and cooling is accomplished in separate shells and wherein rotary pressure feed and discharge valves are provided to feed rows of containers into and discharge rows of containers from the processing conveyor.

BRIEF DESCRIPTION OF THE DRAWINGS

FIG. 1 is a diagrammatic vertical transverse section through a batch type cooking and cooling apparatus shown with a closure plate sealed in pressure tight engagement across the feed and discharge opening of the apparatus.

FIG. 1A is an enlarged vertical section illustrating several carriers.

FIG. 2 is a side elevation of the apparatus of FIG. 1 looking toward the elongated row accommodating opening in the cylindrical wall of the cooker, the closure plate being removed from said opening.

FIG. 3 is an enlarged end elevation of a fragment of the apparatus of FIG. 1 illustrating the drive parts for the conveyor and for the feed mechanism, certain parts being broken away.

FIG. 4 is a diagrammatic transverse section similar to FIG. 1 but illustrating a second embodiment of the invention, said apparatus being adopted to handle containers such as squat cans or hermetically sealed pouches.

FIG. 4A is a diagrammatic elevation illustrating the paths of movement of the processing conveyor and the container retaining conveyor.

FIG. 5 is a section taken substantially along lines 5—5 of FIG. 4 illustrating U-shaped carriers with a mesh conveyor for retaining the rows of containers therein.

FIG. 5A is a perspective of a fragment of the mesh conveyor.

FIG. 6 is an enlarged section taken along lines 6—6 of FIG. 5.

FIG. 7 is an end view of the apparatus of FIG. 4 illustrating the drive for the conveyors.

FIG. 8 is a diagrammatic vertical transverse section of a third embodiment of the apparatus of the present invention, said apparatus being of the continuous type.

FIG. 9 is a plan of the apparatus of FIG. 8 diagrammatically illustrating the drive and the cooling system for the same.

FIG. 10 is an enlarged diagrammatic vertical section taken along lines 10—10 of FIG. 9 through one of the rotary pressure valves.

FIG. 11 is an enlarged diagrammatic horizontal section taken along lines 11—11 of FIG. 10.

FIG. 12 is an end view of the apparatus of FIG. 8 illustrating the drive for the feed mechanism, processing conveyors, and rotary pressure valves.

FIG. 13 is a diagrammatic vertical transverse section of a fourth embodiment of a heat treatment apparatus of the present invention, said apparatus being of a continuous type suitable for processing glass jars.

FIG. 14 is an end elevation of the apparatus of FIG. 13 illustrating the drive for the same.

FIG. 15 is a diagrammatic vertical transverse section of a fifth embodiment of the invention, said apparatus being of the batch type with only two rows of containers being shown in the carriers.

FIG. 15A is an enlarged vertical section illustrating several adjacent carriers spirally wound upon each other.

FIG. 16 is an end view of a fragment of the apparatus of FIG. 15 illustrating the drive for the apparatus of FIG. 15, certain parts being cut away.

FIG. 17 is an enlarged diagrammatic section taken along lines 17—17 of FIG. 16 illustrating portions of the drive mechanism, certain parts being shown diagrammatically.

FIGS. 18 and 19 are diagrammatic operational views of the apparatus of FIG. 15.

DESCRIPTION OF PREFERRED EMBODIMENT

The first embodiment of the heat treatment apparatus 0 (FIGS. 1 to 3) of the present invention is of the batch processing type which first cooks and thereafter cools rows of containers C while the containers are confined within a single cylindrical pressure vessel or housing 22.

The apparatus 20 comprises the housing 22 which includes a cylindrical wall 24 having an elongated row accommodating feed and discharge opening 26 therein. The open ends of the cylindrical wall 24 are sealed by end walls or plates 28 and 30, and the opening 26 is sealed by a removable closure plate 32 thereby providing a housing which is pressure tight during processing. The closure plate 32 may be sealed to the housing 22 by any suitable means such as by bolting. A plurality of axially spaced reinforcing ribs 34 are welded to the cylindrical wall 24 across the opening 26 to reinforce the housing in this area, and each rib 34 has an opening 36 (FIG. 1) therein to accommodate a feed conveyor 38 at a feed station FS, a discharge conveyor 40 at a discharge station DS, and a pivotally mounted feed mechanism 42 therein.

The feed conveyor 38 and discharge conveyor 40 may be separate endless conveyors when it is desired to move the containers to be processed and the containers already processed in the same direction as illustrated in FIG. 1; or, the feed and discharge conveyors may be the upper and lower runs, respectively, of a single endless conveyor if it desired to feed the containers to the machine in one direction and remove the processed containers from the apparatus in the opposite direction. Preferably, the conveyors 38 and 40 are continuously driven in the direction indicated by the arrows in FIG. 2, and are supported by racks 44 and 46 which are rigidly secured to the ribs 34.

The feed conveyor 38 is of the well known type wherein cooker length rows of containers are formed thereon and cooperates with a container stop 48 (FIG. 2) in the form of a shock absorber at the downstream end of the feed conveyor 38 to stop one end of each row of containers being formed at a point adjacent one end of the elongated opening 26 in the cylindrical wall 24 of the housing 22. A container arrester 50 is positioned near the other end of the opening 26 and is intermittently actuated to momentarily arrest upstream containers so that cooker length rows of containers are formed downstream of arrester 50 and can subsequently be deflected by the feed mechanism 42 transversely of the feed conveyor 38 through the opening 26 into the housing 22 without interference from the containers upstream of the arrester 50.

Since the details of the feed conveyor 38, discharge conveyor 40 and arrester 50 are not critical to the subject invention, these components will not be described in further detail. If a full description of these parts should be desired, reference may be had to Pat. No. 3,144,122 which issued to John F. French on Aug. 11, 1964. It will be understood that the discharge conveyor 40 is driven at a speed which will remove each row of processed containers discharged from the housing 22 away from the opening 26 before the next processed row of containers is discharged from the housing.

An important feature of the invention is the provision of an endless processing conveyor 60 (FIG. 1) positioned within the housing 22 in a generally spiral configuration. The conveyor 60 comprises a pair of spaced parallel chains 62 having a plurality of elongated, evenly spaced row accommodating carriers 64 connected therebetween. The chains 62 are trained around a spaced pair of small diameter drive sprockets 66, and around a spaced pair of take-up sprockets 68.

The drive sprockets 66 are keyed to a conveyor drive shaft 70 which is supported for rotation in vertical frame structures 69 secured within the cylindrical wall 24 of the housing 22 near the end plates 28 and 30 and project through stuffing boxes or the like in end plates 28 and 30; and the take-up sprockets 68 are likewise keyed to a shaft 72 which is supported for rotation by the frame structures. As clearly illustrated in FIG. 1, two oppositely moving runs of the processing conveyor 60 are spiralled inwardly of the drive sprockets 66 to the take-up sprockets 68 at the inner end of the spiral, and are maintained in this position by cooperation between the sprockets 66 and 68 with pairs of generally spiral tracks 74 of channel shaped cross-section, which tracks are supported by the two spaced vertical frame structures 69.

The carriers 64 are preferably about seven feet long and accordingly will handle cooker length rows of abutting containers which are about seven feet long. Each carrier includes an elongated central web 80 (FIG. 1A) extending between and secured to associated links on the chains 62. A narrow container retaining flange 82 extends the full length of the web and is formed integrally with one longitudinal edge thereof, and a wide flange 84 also extends the full length of the web and is formed integrally with the other longitudinal edge thereof. Each carrier 64 is mounted on its associated links so that the narrow flange is of greater distance from the pitch line of the associated links as compared to the distance between the pitch line and the wide flange 84. Placement of the carrier 64 on the chains as above described and with the narrow flanges radially outward of the chains as the carriers move around the drive sprockets 66 causes the narrow flanges of adjacent carriers to separate a sufficient distance to allow a relatively large size range of containers to be fed into the carriers and to be completely supported thereby throughout a major portion of their path of travel.

In order to assure retention of small containers in the carriers, curved container supporting guide plates 88 are rigidly secured to the frame structures 69 and are positioned in the lower half of the housing immediately below those runs of the conveyor 60 which have the narrow flanges lowermost therein. The guide plates 88 are perforated at 88a to permit the heat treatment mediums to pass therethrough, and also effect agitation of the contents of the small containers since cylindrical containers resting thereagainst will roll over the guide plates as they are advanced therepast by the carriers. It will be understood that large containers will be fully supported by carriers in the areas below the sprockets 66 and 68, and that guide plates 88' and 88", respectively, maintain the containers in the carriers at these points. Thus, if only large containers are to be processed, only the guides 88' and 88" need be used.

The conveyor 60 is driven in the direction indicated by the arrows in FIG. 1 by a gear motor 89 (FIGS. 2 and 3) which is mounted by a bracket 90 to the housing end plate 30, and by a chain drive 91 which connects the output shaft of the motor 89 to the drive shaft 70.

A discharge plate 92 (FIGS. 1 and 3) is secured to a shaft 93 which is pivotally mounted in the end plates 28 and 30 and adjacent one edge of the container guide plate 88' which is positioned below the drive sprockets 66. The discharge plate 92 is moved to an upper, container retaining position when the closure plate 32 is sealed to the housing 22 as indicated in full lines in FIG. 1 thereby allowing the conveyor to be driven within the housing 22 without loss of containers therefrom while the closure plate 32 is sealed to the housing. The discharge plate 92 is pivoted into a lower discharge position, as indicated in full lines in FIG. 3 and phantom lines in FIG. 1, when the closure plate 32 is removed, and serves as a ramp to direct the rows of containers onto the discharge conveyor 40. The discharge plate 92 is pivoted between and locked in either of the above selected positions by a latching device 94 (FIG. 3) which includes an arm 96 secured to the shaft 93. A spring loaded locking pin 97 is slidably received in the free end of the arm 96 and extends into one of two holes (only one being shown) formed in the outer surface of the end plate 30 thereby locking the discharge plate 92 in either of its selected positions.

In order to feed the rows of containers into the carriers 64 as the carriers move around the drive sprocket 66 past the feed station FS, the feed mechanism 42 (FIG. 3) is actuated in timed relation with the movement of the processing conveyor 60. The feed mechanism 42 comprises a transfer bar 102 which is welded to arms 104 that are, in turn, rigidly connected to a shaft 106 that is pivotally supported by the reinforcing ribs 34. Power means such as a solenoid or cylinder 108 is pivotally connected between the housing 22 and a lever 109 keyed to the shaft 106, and normally holds the transfer bar 102 in the inactive position shown in FIG. 3. A cam 110 having a plurality of lobes 112 thereon is keyed to the drive shaft 70, and the lobes are angularly spaced apart a distance equal to the angular spacing of the carriers 64 when moving around the drive sprockets 66. A normally open switch 114 is mounted on the end plate 30 and is connected to a source of power indicated by main lines L1 and L2. Actuating element 116 of switch 114 is disposed in position to engage the lobes 112 as they are moved past switch 114 thereby closing the switch and momentarily energizing power means 108 through lines 118, 119 and manually operated switch 120. Energization of power means 108 deflects a row of containers from the feed conveyor 38 into the particular carrier 64 that is moving past the feed station FS.

During operation of the first embodiment of the heat treatment apparatus 20 of the present invention, the closure plate 32 is moved a sufficient distance so as to clear the elongated housing opening 26, discharge plate 92 is pivoted to its lower or discharge position, and the motor 89 is started thereby driving the processing conveyor 60 in the direction indicated by the arrows on FIG. 1. Manual switch 120 is closed and cam lobes 112 periodically close switch 114 energizing power means 108 thereby causing the transfer bar 102 of the feed mechanism 42 to periodically swing across the feed conveyor 38 and deflect a row of containers into each carrier 64 as it moves past the feed station FS.

After all the carriers 64 have been loaded; the motor 89 is stopped, the manual switch 120 is opened thereby opening the circuit to power means 108 to deactivate it, the discharge plate is pivoted upwardly to its processing position, and the closure plate 32 is sealed in pressure tight relationship over the elongated opening 26.

A heat treatment medium, such as steam at 250° F. and 15 p.s.i.g., is then directed into the housing 22 through valved conduit 124 and the motor is started thereby driving the processing conveyor 60 and initiating the cooking cycle. After the containers have been subjected to the cooking medium for a sufficient period of time to sterilize the contents of the containers, the steam is turned off thereby completing the cooking cycle.

The steam is then vented through valved conduit 126, and simultaneously therewith cold water is directed onto the containers in the form of sprays from valved conduit system 128. After the containers have been cooled to below 212° F., the motor 89 is stopped, the cooling water is drained from the housing 22 through valved conduit 130, and the closure plate 32 is removed from the opening 26. The discharge plate 92 is then moved to the discharge position, the manual switch 120 is closed and the motor 89 is again started and allowed to run until all of the processed rows of containers have been discharged from the carrier 64. Simultaneously with the discharge of processed rows of containers from the carriers, rows of containers to be processed are loaded into the empty carriers thereby initiating a second cycle of operation of the batch type heat treatment apparatus 20.

The heat treatment apparatus 20a (FIGS. 4 to 7) of the second embodiment of the invention is also of the batch type and is quite similar to the apparatus 20. Because of the similarity, parts of the apparatus 20a which are similar to those of the apparatus 20 will be assigned the same numerals followed by the letter "a," and only those parts of the apparatus 20a which differ from the apparatus 20 will be described in detail. The apparatus 20a is especially adapted to handle containers such as squat or flat cans, or irregularly shaped containers such as plastic pouches.

The apparatus 20a comprises a housing 22a having an endless processing conveyor 60a spirally wound therein. A feed mechanism 42a is intermittently actuated to feed rows of containers C from feed conveyor 38a through an elongated opening 26a into the housing and into U-shaped carriers 131 mounted on the processing conveyor 60a. At the same time, processed rows of containers are discharged from the carriers 131 over discharge plate 92a and onto discharge conveyor 40a. During processing, the discharge plate is pivoted to its upper position, closure plate 32a is bolted in pressure tight engagement over the elongated opening 26a and heat treatment including cooling mediums are directed into the pressure tight housing 22a through conduit systems 124a, 126a, and 128a as described in the first embodiment of the invention.

The apparatus 20a differs from the apparatus 20 in that the carriers 131 (FIG. 6) are of generally U-shape cross-section having an opening 132 at one end of each carrier, and accordingly, will not confine containers therein when the opening 132 is directed downwardly. In order to confine the rows of containers within the carriers 131 when the openings 132 are directed downwardly, the openings are disposed immediately adjacent an endless container retaining mesh conveyor 133. The mesh conveyor 133 extends the full length of the carriers 131 and is supported by a pair of spaced endless chains 134 (only one being shown) which chains are guided by channel tracks 135 rigidly secured to the frame structures 69a immediately adjacent the tracks 74a which guide the processing conveyor 60a. The chains 134 are trained around drive sprockets 136 keyed to a shaft 137 journaled in the frame structures 69a and extending through end wall 30a.

As indicated in FIG. 4, the retaining conveyor 133 is disposed immediately adjacent the opening 132 in each carrier 131 when the opening is directed downwardly. The retaining conveyor 133 is driven at substantially the same rate of speed as the processing conveyor 60a thereby providing a moving closure or gate for the carriers 131, and accordingly, allowing the carriers to handle substantially any type or combination of types of containers.

The processing conveyor 60a and retaining conveyor 133 are preferably driven by gear motor 89a (FIG. 7) which is connected to the drive shaft 70a of the processing conveyor 60a by a chain drive 91a. The retaining conveyor 133 is driven at substantially the same speed as the processing conveyor 60a by an idler shaft 138 that is journaled on the end plate 30a and is drivingly connected to the shaft 70a by bevel gears 139 and to the shaft 137 by bevel gears 140. The feed mechanism 42a is driven in a manner identical to that described in the first embodiment of the invention, and accordingly, the description of the feed mechanism will not be repeated.

In the event cylindrical containers are being handled in the carriers 131 it will be understood that the retaining conveyor 133 may be driven in either direction and at any desirable speed relative to the processing conveyor, thereby causing the containers to roll about their own axes. In this regard, a reversible, variable speed motor (not shown) may be substituted for the retaining conveyor drive illustrated in the drawings.

The heat treatment apparatus 20b (FIGS. 8 to 12) of the third embodiment of the invention is of the continuous type rather than of the batch type and is ideally suited to handle rows of cylindrical cans. In general, the apparatus 20b comprises a rotary pressure feed valve 150 which directs rows of containers into a pressure cooker 152, a rotary pressure discharge valve 154 which receives the rows of containers from the cooker and directs them into an atmospheric cooler 156 wherein the containers are cooled.

The cooker 152 includes a cylindrical housing 160 defined by a cylindrical body 162 having walls 164 and 166 bolted to the ends thereof in pressure tight relationship. An elongated inlet opening 168 and a similar discharge opening 170 are formed in the cylindrical body 162 and have the pressure feed valve 150 and pressure discharge valve 154, respectively, communicating therewith. A relatively wide endless processing conveyor 172 is similar to the conveyor 60 of the first embodiment of the apparatus and includes spaced parallel chains 174 (only one being shown) having a plurality of equally spaced elongated carriers 176 extending therebetween and connected thereto. Each adjacent pair of carriers 176 cooperate to confine a row of containers therebetween during a major portion of its travel through the cooker 152. The chains 174 are trained around a spaced pair of small diameter feed sprockets 178, a spaced pair of small diameter discharge sprockets 180, and a spaced pair of take-up sprockets 182. The feed sprockets 178 and discharge sprockets 180 are disposed immediately adjacent the pressure feed valve 150 and discharge valve 154, respectively, and cause the outer narrow flanges of the carriers 176 to separate a sufficient distance to permit rows of containers to enter the carriers 176 from the feed valve 150 and discharge from the carriers 176 into the discharge valve 154. The take-up sprockets 182 are disposed near and are parallel to the longitudinal axis of the cooker housing 160 and cooperate with the sprockets 178 and 180, and with complementary pairs of chain guide tracks 184 to guide the conveyor along a spiral path within the housing 160. The pairs of sprockets 178, 180 and 182 are keyed to shafts 186, 188 and 190, respectively, which shafts are journaled in spaced frame structures 192 that are secured within the cylindrical body 162 immediately adjacent the end walls 164 and 166. The shafts 186 and 188 also project outwardly through the end walls 164 and 166 and are suitably sealed to the walls by stuffing boxes or the like. Curved container guide plates 193 are rigidly secured to the frame structure 192 below those lower spiral flights of the conveyor whereing the narrow carrier flanges are lowermost.

The atmospheric cooler 156 is quite similar to the cooker 152, and accordingly, will not be described in detail. Parts of the cooler 156 which are similar to the cooker will be assigned the same numerals followed by the letter "b."

It will be understood that the pressure discharge valve 154 acts as a feed valve for the cooler and directs rows of containers into the carriers 176b of the cooler conveyor 172b as the carriers move around the sharp bend defined by sprockets 178b. The discharge or rows of containers from the cooler occurs when the carriers 176b move around sprockets 180b which causes the rows of containers to gravitate out of the carriers 176b through elongated opening 170b in housing 160b of the cooler and onto a continuously driven discharge conveyor 196.

The rotary pressure valves 150 and 154 are substantially the same, and accordingly, only the feed valve 150 will be described in detail and the same numerals followed by the letter "b" will be assigned to equivalent parts of the discharge valve 154.

The pressure feed valve 150 (FIGS. 10 and 11) comprises a cylindrical housing 198 that is partially fitted within the inlet opening 168 of the cooker housing 160 and is sealed thereto in fluid tight engagement. An elongated inlet opening 199 and discharge opening 200 are formed in the cylindrical surface of the housing 198, and the ends of the housing 198 are sealed by walls 201 which are centrally apertured to rotatably receive a shaft 202 therein. A rotor 204 is keyed to the shaft 202 and is disposed within the housing 198. A plurality of equally spaced legs 206 project radially outward of the rotor and define container confining pockets 208 therebetween, which pockets are sufficiently long to accommodate rows of containers C that are about seven feet long.

Annular end walls 210 are integrally formed on each end of the rotor legs 206 to seal the ends of the pockets 208 upon sliding engagement with annular packing rings 212. The outer periphery of each leg 206 is provided with an elongated slot 214 which receives a packing strip 216 that is urged against the inner surface of cylindrical housing 198 by springs 218. Thus, each pocket 208 of the feed valve 150 is sealed to the housing 198 when the pocket is moving between the openings 199 and 200 thereby cooperating with similarly sealed pockets 208b (FIG. 8) in the discharge valve 154 to retain a superatmospheric pressure within the cooker 152. Arcuate retaining flanges (not shown) are provided for engaging the end portions of the packing strips 216 so as to prevent the strips from moving out of their slots 214 when the strips move past the inlet opening 199 and the discharge opening 200.

A feed mechanism 220 (FIG. 12) which is quite similar to the feed mechanism 42 (FIG. 1) of the first embodiment of the invention is provided for deflecting rows of containers transversely from a continuously driven feed conveyor 221 through the opening 199 into the pockets 208 of the feed valve 150. As in the first embodiment of the invention, the feed mechanism 220 includes a pivotally mounted transfer bar 222 which is intermittently actuated by a power means such as a cylinder or solenoid 224 in response to the closing of a switch 226 by equally spaced lobes on the periphery of a cam 228 keyed to feed sprocket shaft 186. Switch 226 is connected to a power source indicated by main power lines L1 and L2.

Steam or a steam air mixture under superatmospheric pressure is directed into the cooker 152 through valved conduits 230 and 231 at the desired temperature and pressure for the particular product being processed; and cool water, preferably in the form of spray, is directed into the cooler 156 through a valved conduit system 232. Condensate is drained from the cooker 152 by valved conduits 234, and the cooling water is drained from the cooler 156 by valve conduits 236.

The cooker conveyor 172 (FIG. 8), the cooler conveyor 172b, the rotary pressure feed valve 150, and the rotary pressure discharge valve 154 are driven in timed relation by a drive train 238 (FIGS. 9 and 12) which receives its power from a gear motor 240 which may be a variable speed gear motor. The gear motor 240 is mounted on a support plate 242 secured to the end wall 166 and is connected to the feed sprocket shaft 186 by a chain drive 244 which drives the shaft 186 in a clockwise direction (FIG. 12). Spur gears 246 and 248 are keyed to shaft 186 and to the shaft 202 of the pressure feed valve 150 thereby driving the rotor 204 of the feed valve in a counterclockwise direction.

Power is transmitted from conveyor feed shaft 186 to conveyor discharge shaft 188 by a line shaft 250 that is rotatably mounted on end wall 166, and has bevel gears 252 and 254 keyed to opposite ends thereof. Bevel gear 252 meshes with a bevel gear 256 keyed on shaft 186, and bevel gear 254 meshes with a bevel gear 258 keyed to the conveyor discharge shaft 188 thereby driving the shaft 188 in a clockwise direction. A spur gear 260 keyed to shaft 188 meshes with a spur gear 262 keyed to shaft 202b of the pressure discharge valve 154, and the gear 262 meshes with a gear 264 keyed to the feed shaft 186b of the cooler conveyor 172b (FIG. 8). Thus, the rotor 204b of the pressure discharge valve 154 is driven in a counter-clockwise direction, and the feed shaft 186b of the cooler 156 is driven in a clockwise direction.

The discharge shaft 188b (FIGS. 9 and 12) of the cooler 156 is connected to the feed shaft 186b by a line shaft 266 rotatably mounted on a wall 166b having bevel gears 268 and 270 keyed to opposite ends thereof and meshing with bevel gears 272 and 274 keyed to shaft 186b and 188b, respectively.

During operation of the apparatus 20b of the third embodiment of the invention, steam under a pressure of about 15 p.s.i.g. and at a temperature of about 250° F., is directed into the cooker 152 through conduit 230 and 231, and cooling water is directed into the atmospheric cooler 156 through conduit system 232. The motor 240 is then started thereby intermittently actuating the feed mechanism 220 through power means 224, and continuously driving the rotary pressure feed valve 150, the cooker conveyor 172, the rotary pressure discharge valve 154, and the cooler conveyor 172b in the directions indicated by the arrows in the drawings and at a rate which is dependent upon can speed requirements and processing time.

The rows of containers are deflected off the continuously driven feed conveyor 221 by the transfer bar 222 of the feed mechanism 220 and are received in the pockets 208 (FIG. 10) in the pressure feed valve 150. The rows of containers then drop from the pockets 208 into the carriers 176 of the cooker conveyor 172. The rows of carriers are then spiraled inwardly and thereafter spiraled outwardly while subjected to 250° F. steam in the cooker, and upon completion of the cooking operation gravitate into the pockets 208b (FIG. 8) of the rotary discharge valve 154. The rows of containers then gravitate into the carriers 176b of the cooler conveyor 172b and are advanced through the sprays of cooling water before being discharged from the carriers 176b onto the continuously driven discharge conveyor 196 thus completing the automatic cooking and cooling operation.

The heat treatment apparatus 20c (FIGS. 13 and 14) of the fourth embodiment of the invention is of the automatic type and is ideally suited to handle rows of wide mouth glass jars. When processing wide mouthed glass jars, it is necessary to maintain a greater pressure on the external surfaces of the jars than on the internal surfaces so as to avoid dislodgment of the caps from the jars due to high pressures within the jars. It will be understood, of course, that cooking temperatures above 212° F. will cause steam as well as non-condensible gases to form within the jars.

Since the apparatus 20c is somewhat similar to the apparatus 20b of the third embodiment of the invention, only the differences between the two heat treatment apparatus will be described in detail, and parts of the apparatus 20c which are similar to parts of the apparatus 20b will be assigned the same numerals followed by the letter "c."

The apparatus 20c comprises a cooker 152c and a cooler 156c having generally cylindrical housings 160c and 160bc which are interconnected near the upper ends by an open ended tunnel 300. The tunnel 300 is of rectangular cross section and is sealed in pressure tight relationship to the housings 160c and 160bc adjacent row accommodating rectangular openings 302 and 304, respectively, that are formed in the housings. The rotary pressure feed valve 150c is sealed to an elongated inlet opening 168c near the upper end of the cooker housing 160c, and the rotary pressure discharge valve 154c is sealed in pressure tight relationship to the discharge opening 170bc near the upper end of the cooler housing 160bc.

A single endless processing conveyor 172c having elongated carriers 176c is guided through the tunnel 300 and through both the cooker and the cooler housings 160c and 160bc by tracks 185c which include spiral portions in both the cooker and the cooler. The conveyor 172c is also trained around pairs of small diameter feed sprockets 178c keyed to shaft 186c and disposed adjacent to and below feed valve 150c; around small diameter discharge sprockets 180c keyed to shaft 188c disposed adjacent to and above discharge valve 154c; around take-up sprockets 182c keyed to shaft 190c near the center of cooker housing 160c, and around take-up sprockets 182bc keyed to shaft 190bc near the center of cooler housing 160bc. The shafts are journaled on frame structures 192c and curved container guide plates 193c are secured to the frame structure in a manner similar to that described in the other embodiments of the invention.

The processing conveyor 172c, rotary pressure feed valve 150c, and rotary pressure discharge valve 154c are all continuously driven in the direction of the arrows in FIGS. 13 and 14 by a gear motor 310 or a variable speed gear motor. The output shaft of gear motor 310 is connected by chain drive 314 to the shaft 202c of the pressure feed valve 150c. Gear 318 keyed to the valve shaft 202c meshes with gear 320 keyed to the shaft 186c. A line shaft 315 journaled on the housing 152c and 156c has one end connected to shaft 186c by bevel gear drive 316 and the other end connected to shaft 188c by bevel gear drive 317. A gear 322 is keyed to discharge valve shaft 202bc and meshes with gear 323 keyed to shaft 188c thereby driving the rotor of discharge valve 154c in the direction indicated by the arrows in FIG. 14.

Rows of containers C are fed into the feed valve 150c from feed conveyor 221c by a feed mechanism 220c (diagrammatically shown) which is identical to the feed mechanism 220b of the third embodiment of the invention. These rows of containers are then passed through the cooker and cooler by the conveyor 172c and are subsequently discharged from the discharge valve 154c onto the discharge conveyor 196c.

During operation of the fourth embodiment of the invention, the cooker 152c is filled with hot water from a conduit 320 and is maintained at a temperature of about 250° F. and 15 p.s.i.g.; where the water level is maintained slightly below that of the tunnel 300. Cooling water is circulated through the cooler 156c from a conduit system 330 and is maintained at a level below that of the tunnel 300. An overriding pressure is maintained over the water in the cooker and cooler either by air, or by a steam air mixture directed into the apparatus 20c at about 20 p.s.i.g. through valved conduit 332.

Rows of containers C, preferably glass jars, are then deflected into the feed valve 150c by feed mechanism 220c and are transferred from the feed valve 150c into the carriers 176c of processing conveyor 172c. The rows of containers are then moved spirally through the hot water in the cooker thereby cooking the contents of the containers. After the containers have been cooked, they are moved by the conveyor 172c through the tunnel 300 into the cooler 156c. The processing conveyor 172c then spirally advances the carriers and containers through the cooling water and after the containers have been cooled, releases the rows of containers into the discharge valve 154c. The discharge valve 154c removes the rows of containers from the superatmospheric pressure within the apparatus 20c and discharges the cooled containers onto the discharge conveyor 196c.

The heat treatment apparatus 20d (FIGS. 15 to 19) of the fifth embodiment of the present invention is of the batch processing type and is especially suitable for use in small canneries.

The apparatus 20d comprises a cylindrical housing 360 defined by a cylindrical shell 362 having end closure plates 364 secured in pressure tight relationship to opposite ends thereof. An elongated feed and discharge opening 366 is formed in the shell 362 and is open during the container feed and discharge operations and is closed in pressure tight relationship by a closure plate 367 during the cooking and cooling operations.

An upper drum 368, a lower drum 370 and a pair of spaced small diameter drive sprockets 372 are disposed within the housing 360 keyed to shafts 374, 376, and 378, respectively, and cooperate to define conveyor supporting means. The shafts 374, 376, and 378 are journaled in vertical frame structures 379 near the end plates 364.

A processing conveyor 380 is defined by a pair of spaced chains 382 (only one chain being shown) having a plurality of evenly spaced container confining carriers 384 of generally T-shaped cross section rigidly secured to associated links of the chains in a manner similar to that of the first embodiment of the invention. One end of each chain is pivotally attached to the upper drum 368, the chains are trained around the sprockets 372, and the other end of each chain is pivotally attached to the lower drum 370. Thus, the drums act as chain anchoring means and movement of the drums 368 and 370 in a counterclockwise direction (FIG. 15) will cause the conveyor 380 to spirally wind upon the upper drum 368 and unwind from the lower drum 370 as indicated in FIG. 19; and movement of the drums 368 and 370 in a clockwise direction will cause the conveyor 380 to spirally wind upon the lower drum 370 and unwind from the upper drum 368.

The portion of the shell 362 adjacent the opening 366 is reinforced by ribs 388 which have openings 390 therein through which a feed conveyor 392 and a discharge conveyor 394 are driven.

A feed mechanism 396 (FIG. 16), which is identical to the feed mechanism associated with the first embodiment of the invention, is arranged to deflect rows of containers C from the feed conveyor 392 into the carriers 384 as the carriers move upwardly around the sprockets 372. The feed mechanism 396 includes a transfer bar 402 which is welded to arms 404 rigid with a shaft 406 pivotally supported by the reinforcing ribs 388. A power means such as a cylinder or solenoid 408 is pivotally connected between the housing 360 and a lever 409 keyed to shaft 406, and normally holds the transfer bar 402 in the inactive position shown in FIG. 16. A cam 410 having a plurality of lobes 412 thereon, which lobes are angularly spaced apart a distance equal to the angular spacing of the carriers 384 (FIG. 18) moving around the sprockets 372, is keyed to the drive shaft 378. A normally open switch 414 is mounted on one of the end plates 364 and is connected to a source of power indicated by main lines L1 and L2 (FIG. 17). Actuating element 416 of switch 414 is disposed in position to engage the lobes 412 as they are moved past switch 414 thereby closing the switch and momentarily energizing power means 408 through lines 418, 419 and manually operated switch 420. Energization of power means 408 deflects rows of containers from the feed conveyor 392 into the particular carrier 384 that is moving past the feed station.

A drive mechanism 424 (FIGS. 16 and 17) is provided in order to drive the processing conveyors 380 and activate the feed mechanism 396 in timed relation. The drive mechanism 424 includes a reversible gear motor 426 which is connected to the drive sprocket shaft 378 by a chain drive 428, and accordingly, drives the shaft 378 at a constant speed. A spur gear 430 keyed to the shaft 378 meshes with a similar gear 432 keyed to a stub shaft 434 journaled in a bracket 437 that is secured to one of the end plates 364.

An upper drum slip clutch 436 (FIG. 17) is journaled on the shaft 434 and includes a drive sprocket 438 that is bolted to the hub of a clutch plate 442 and is connected to the shaft 374 by a chain drive 443. The clutch plate 442 is firmly urged against a clutching surface of the gear 432 by a spring 444 and cooperating spring adjustment nuts 445 screwed onto the stub shaft 434. The hub has an annular groove 446 in its outer periphery which groove receives cooperating rollers (not shown) journaled on one end of a shifting fork 448 which is pivoted on a pin 450 secured to the bracket 437. The actuating element 452 of the upper slip clutch power means 454 is pivotally connected to the other end of the shifting fork 448. When the power means 454 is energized the clutch plate 442 is pivoted out of clutching engagement with the gear 432 thus disconnecting the gear motor 426 from the upper drum 368. Energization of power means 454 also causes a flat surface of the plate 442 to engage a spring loaded brake shoe 439 which applies frictional force to a surface of the clutch plate 442. This frictional force resists free rotation of the upper drum thereby maintaining the processing conveyor taut when the slip clutch 436 is disengaged from the motor.

A lower drum slip clutch 456 is journaled on stub shaft 434 and includes a drive sprocket 458 that is bolted to the hub of a clutch plate 462 and is connected to the shaft 376 by a chain drive 463. The clutch plate 462 is normally urged against another clutching surface of the gear 432 by a spring 464 and cooperating nuts 465 screwed onto the stub shaft 434. The hub of the clutch plate 462 has an annular groove 464 in its periphery which receives rollers (not shown) on one end of a shifting fork 468, which fork is pivoted on a pin 470 secured to the bracket 437. The actuating element 472 of a lower slip clutch power means such as a cylinder or solenoid 474 is pivotally connected to the other end of the shifting fork 468, and when energized causes the clutch plate 462 to pivot out of clutching engagement with the gear 432 as indicated in FIG. 17 thus disconnecting the drive between the motor 426 and the lower drum 370. A spring loaded brake shoe 475 is supported by bracket 437 and is engaged by a surface of the clutch plate 462 when the power means 474 is energized thus maintaining the conveyor 380 under tension during this time.

In order to selectively activate the power means 454 and 474 main lines L1 and L2 are connected to a source of power, and line L1 is connected to both power means. Main line L2 is connected to a manually operated switch 478 which is movable between a first position closing a circuit to lower slip clutch 474 thus disconnecting the drive to the lower drum 370, and a second position closing a circuit to the upper slip clutch power means 454 thus disconnecting the drive to the upper drum 368.

The reversible motor 426 and manually operated control switch for the same are well known in the art and accordingly will not be described in detail. If additional information is desired, reference may be had to U.S. Pat. No. 3,003,363 which issued on Oct. 10, 1961 to Edward S. DeHart for an illustration of a wiring diagram and manually operated control switch for such reversible motor.

At the beginning of a cycle of operation of the fifth embodiment of the heat treatment apparatus 20d, the conveyor 380 is wound around the lower drum 370 and the closure plate 367 is removed from the opening 366. The reversible gear motor 426 is then activated so as to drive the feed sprocket shaft 378 in a clockwise direction (FIG. 15), and the manually operated switch 478 is placed in the position illustrated in FIG. 17 thereby energizing the lower slip clutch power means 474 and disconnecting the drive mechanism from the lower drum 370. Energization of power means 474 also causes the brake shoe 475 to engage clutch plate 462 thus frictionally resisting free rotational movement of the lower drum. If a processed batch of containers C is in the carriers 384 of the processing conveyor 380, movement of the carriers upwardly toward the drive sprockets 372 causes the carriers to move the containers past a guide plate 489 and over a discharge plate 490 which is pivoted to its lowermost position as illustrated in FIG. 18. Movement of the carriers around sprockets 372 causes the carriers to open and discharge the rows of processed containers onto the discharge conveyor 394 for removal from the apparatus. Simultaneously with the discharge of the processed rows of containers from the carriers 384, rows of containers to be processed are deflected from the feed conveyor 392 into the emptied carriers by the feed mechanism 396. As each row of containers to be processed is accommodated in the associated carriers, the processing conveyor 380 is spirally wound around the upper drum 368 as indicated in FIGURE 19. During this spiral winding operation, it will be appreciated that the shaft 378 will be driven at a constant speed and that the upper slip clutch 436 (FIG. 17) will impart a driving force to the upper drum but will permit the upper drum to be driven at a progressively slower speed as the size of the spiral increases on the upper drum.

After all the carriers 384 have been filled with rows of containers, the motor 426 is stopped and the closure plate 367 is connected in fluid tight relationship over the opening 366 in the housing 360. A heat treatment medium such as steam at 250° F. and 15 p.s.i.g. is then introduced into the housing 360 through a conduit 492. After the containers have been subjected to the cooking medium for about 60 minutes thereby completing the cooking operation the steam is vented and then cooling water is introduced into the housing 360 through a valved conduit system indicated diagrammatically at 494, which cooling may be performed by sprays of water and/or by flooding the containers with cool water.

If glass jars are being processed, air under an overriding pressure is introduced into the housing through conduit 496 during both the cooking and cooling operations. The overriding pressure may be such as to assure a pressure of about 20 p.s.i.g. within the housing.

After the containers have been cooled, the cooling water is drained from the housing 360 through a conduit 498. The switch 478 is then moved to the second position thereby energizing the upper slip clutch power means 454 disconnecting the upper slip clutch 456 from the drive system and moving the clutch plate 442 against the friction brake shoe 439 to resist movement of the same. The motor is then operated in a reverse direction causing the shaft 378 to rotate in a counterclockwise direction and the conveyor 380 to unwind from the upper drum 368 and wind upon the lower drum 370. The closure plate 367 is then removed from the feed and discharge opening 366 and the discharge plate is pivoted from the upper position shown in FIG. 19 to its lower position illustrated in FIG. 18. The apparatus 20c is thus prepared for another cycle of operation.

From the foregoing description it is apparent that the heat treatment apparatus of the present invention may be of the batch type or of the semi-continuous type and may use a variety of heat treatment mediums. In each of the several embodiments of the invention, rows of containers, as opposed to single containers, are handled as units and the rows of containers are moved spirally within at least one cylindrical chamber so as to greatly improve the holding capacity of the cylindrical processing chamber.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. A heat treatment apparatus comprising housing means defining a chamber for processing commodities in sealed containers, elongated passageway means through said housing means for accommodating the entrance and discharge of rows of containers, spaced conveyor supporting means in said housing means and having a sharply curved transfer portion at said passageway means, a processing conveyor supported along its edges by said supporting means for movement within said chamber along a path which includes a spiral portion, a plurality of elongated container supporting carriers extending across said conveyor for advancing rows of the containers along said path within the chamber as well as supporting the containers against gravity, means for directing a heat treatment medium into said chamber, drive means connected to a portion of said conveyor supporting means for moving said conveyor along said path, means for moving rows of containers through said elongated passageway means and into and out of the carriers in said chamber as the carriers move past said passageway means, and container retaining means adjacent said elongated passageway means movable between a first position closely adjacent the path of movement of said conveyor for retaining rows of containers in said carriers as the carriers are being moved past said passageway means during a processing operation and a second position spaced from said conveyor for allowing the feeding of containers into and discharging of containers from said carriers.

2. An apparatus according to claim 1 wherein said container retaining means includes closure means movable between a closed position providing a pressure tight seal over said passageway means and an open position accommodating movement of rows of containers through said passageway means, and wherein said heat treatment medium is maintained at superatmospheric pressure when said closure means is in said closed position.

3. An apparatus according to claim 2 wherein said sharply curved transfer portion of said conveyor supporting means is of small diameter and is disposed adjacent said passageway means and wherein said conveyor supporting means also includes a first small diameter conveyor anchoring means and a second small diameter conveyor anchoring means spaced from said first anchoring means, said conveyor being trained around said sharply curved transfer portion and having one end connected to said first anchoring means and the other end connected to said second anchoring means whereby movement of said conveyor in one direction causes said conveyor to spirally wind around one of said anchoring means and unwind from the other anchoring means, and movement of the cnoveyor in the other direction causes said conveyor to spirally wind around said other anchoring means and unwind from said one anchoring means.

4. An apparatus according to claim 2 wherein said closure means includes a plate which is sealed in pressure tight engagement with said elongated passageway means when the containers are being processed; and which is removed from said passageway means when it is desired to feed containers into and discharge containers from said chamber.

5. An apparatus according to claim 2 wherein said conveyor is an endless conveyor movable along a predetermined path, wherein spiral conveyor guide tracks of said conveyor supporting means are fixed within said chamber adjacent said edges of the conveyor and cooperate with movable portions of said conveyor supporting means to maintain a portion of said conveyor in a generally spiral configuration, and wherein container retaining means are disposed below portions of said predetermined path for cooperating with said carriers to partially support the rows of containers moving along said portions of said path.

6. An apparatus according to claim 5 wherein said sharply curved transfer portion of said conveyor suppporting means is of small diameter and is disposed adjacent said passageway means, and wherein said conveyor comprises a pair of spaced chains, a plurality of pivotally connected links in each chain having longitudinal axes parallel to the path of movement of the conveyor, each of said carriers having an elongated central web extending between said chains, a narrow flange on one edge of said web and projecting outwardly from one side of the path of movement of said chains, and a wide flange on the other edge of said web and projecting outwardly from the other side of said path of movement, said narrow flange being disposed radially outward of said sharply curved transfer portion and immediately adjacent said passageway means as the conveyor moves around said transfer portion whereby the narrow flanges are spaced a sufficient distance apart to accommodate movement of the rows of containers between adjacent flanges.

7. An apparatus according to claim 6 wherein said closure means includes a closure plate which is fixed in sealed engagement over said elongated passageway means when the containers are being processed, and which is removed from said passageway means when it is desired to feed rows of containers into and discharge rows of containers from said chamber.

8. An apparatus according to claim 6 wherein said container retaining means includes a two position discharge plate mounted immediately adjacent said passageway means and movable between a first position closely adjacent the path of movement of said conveyor thereby maintaining the rows of containers within said carriers as the carriers move therepast, and a second position spaced from said conveyor thereby permitting the discharge of rows of containers from said carriers when said closure means is in its open position.

9. An apparatus according to claim 5 wherein said closure means includes a plate which is fixed in sealed engagement over said elongated passageway means when the containers are being processed, and which is removed from said passageway means when it is desired to feed rows of containers into and discharge rows of containers from said chamber.

10. An apparatus according to claim 5 wherein said container retaining means is a spirally wound driven retaining conveyor.

11. An apparatus according to claim 10 wherein said container retaining conveyor is driven in the same direction and at substantially the same speed as said processing conveyor.

12. A heat treatment apparatus comprising housing means defining a chamber for processing commodities in sealed containers, elongated passageway means through said housing means for accommodating the entrance and discharge of rows of containers, spaced conveyor supporting means in said housing means and having a sharply curved transfer portion at said passageway means, a processing conveyor supported along its edges by said supporting means for movement within said chamber along a path which includes a spiral portion, a plurality of elongated container supporting carriers extending across said conveyor for advancing rows of the containers along said path within the chamber as well as supporting the containers against gravity, means for directing a heat treatment medium into said chamber, drive means connected to a portion of said conveyor supporting means for moving said conveyor along said path, and means for moving rows of containers through said elongated passageway means and into and out of the carriers in said chamber as the carriers move past said passageway means, said sharply curved transfer portion of said conveyor supporting means including small diameter sprockets disposed adjacent said passageway means and conveyor supporting means also including a first small diameter conveyor anchoring means and a second small diameter conveyor anchoring means spaced from said first anchoring means, said conveyor being trained around said sharply curved transfer portion and having one end connected to said first anchoring means and the other end connected to said second anchoring means whereby movement of said conveyor in one direction causes said conveyor to spirally wind around one of said anchoring means and unwind from the other anchoring means, and movement of the conveyor in the other direction causes said conveyor to spirally wind around said other anchoring means and unwind from said one anchoring means.

13. An apparatus according to claim 12 wherein said conveyor comprises a pair of spaced chains, a plurality of pivotally connected links in each chain having longitudinal axes, and means connecting opposite ends of each carrier to associated ones of said links; each of said carriers having an elongated central web extending between said chains, a narrow flange on one edge of said web and projecting outwardly from one side of the path of movement of said chains, and a wide flange on the other edge of said web and projecting outwardly from the other side of said path of movement, said narrow flange being disposed radially outward of said transfer portion and immediately adjacent said passageway means as the conveyor moves around said transfer portion whereby the narrow flanges are spaced a sufficient distance apart to accommodate movement of rows of containers therebetween.

14. An apparatus according to claim 13 wherein said conveyor when at one end of its movement is spiraled at least two turns around one of said anchoring means, and wherein the carriers in the two turns are contacting each other.

15. An apparatus according to claim 12 wherein said conveyor when at one end of its movement is spiraled at least two complete turns around one of said anchoring means, and wherein the carriers in the two turns are in abutting contact with each other.

16. A pressure cooking and cooling apparatus for commodities sealed in containers comprising a cylindrical housing having closed end walls and a longitudinal axis passing through said walls, means defining an elongated opening in said housing which extends substantially the full length of said housing, means for directing a cooking medium under superatmospheric pressure into said housing during a cooking operation, means for directing a cooling medium under superatmospheric pressure into said housing during a cooling operation, a plurality of spaced conveyor supporting means journaled in said housing and extending parallel to the axis of said housing, a conveyor connected to said conveyor supporting means, a plurality of elongated container supporting carriers mounted on said conveyor and extending parallel to the axis of said housing substantially the full length thereof, one of said conveyor supporting means being disposed closely adjacent said elongated opening, means connected to said conveyor supporting means for driving the conveyor causing the carriers to repeatedly move past the elongated opening during the cooking and cooling operations, closure means movable between a closed position for providing a pressure tight seal over said opening for maintaining the cooking medium under superatmospheric pressure during the entire cooking operation and for maintaining the cooling medium under superatmospheric pressure during at least a portion of the cooling operation, and an open position accommodating movement of rows of containers between a position outside said housing and a position within the carriers adjacent said opening, and means for retaining containers within the carriers as they are moved past the elongated opening during the cooking and cooling operations.

17. A heat treatment apparatus comprising housing means defining a chamber for processing commodities in sealed containers, elongated passageway means through said housing means for accommodating the entrance and discharge of rows of containers, spaced conveyor supporting means in said housing means and having a sharply curved transfer portion at said passageway means, a processing conveyor supported along its edges by said supporting means for movement within said chamber along a path which includes a spiral portion, a plurality of elongated container supporting carriers extending across said conveyor for advancing rows of the containers along said path within the chamber as well as supporting the containers against gravity, means for directing a heat treatment medium into said chamber, drive means connected to a portion of said conveyor supporting means for moving said conveyor along said path, and means for moving rows of containers through said elongated passageway means and into and out of the carriers in said chamber as the carriers move past said passageway means, said carriers being of U-shaped cross section having an elongated opening therein, and additionally comprising a container retaining conveyor, second support means mounting said retaining conveyor within said chamber and having certain runs spirally wound and disposed immediately adjacent said openings in said carrier when said carrier openings are directed downwardly, and means for driving said retaining conveyor.

18. An apparatus according to claim 17 wherein said retaining conveyor drive means drives said retaining conveyor at substantially the same speed as said processing conveyor.

19. An apparatus according to claim 17 wherein said container retaining conveyor is a spirally wound driven retaining conveyor.

20. An apparatus according to claim 19 wherein said container retaining conveyor is driven in the same direction and at substantially the same speed as said processing conveyor.

21. A heat treatment apparatus comprising housing means defining a chamber for processing commodities in sealed containers, elongated passageway means through said housing means for accommodating the entrance and discharge of rows of containers, spaced conveyor supporting means in said housing means and having a sharply curved transfer portion at said passageway means, a processing conveyor supported along its edges by said supporting means for movement within said chamber along a path which includes a spiral portion, a plurality of elongated container supporting carriers extending across said conveyor for advancing rows of the containers along said path within the chamber as well as supporting the containers against gravity, means for directing a heat treatment medium into said chamber, drive means connected to a portion of said conveyor supporting means for moving said conveyor along said path, means for moving rows of containers through said elongated passageway means and into and out of the carriers in said chamber as the carriers move past said passageway means, and container retaining means adjacent said elongated passageway means movable between a first position closely adjacent the path of movement of said conveyor for retaining rows of containers in said carriers as the carriers are being moved past said passageway means during a processing operation and a second position spaced from said conveyor for allowing the feeding of containers into and discharging of containers from said carriers, said container retaining means including closure means movable between a closed position providing a pressure tight seal over said passageway means and and an open position accommodating movement of rows of containers through said passageway means, said heat treatment medium being maintained at superatmospheric pressure when said closure means is in said closed position, said carriers being of U-shaped cross section having an elongated opening therein, and additionally comprising a container retaining conveyor, second support means mounting said retaining conveyor within said chamber and having certain runs spirally wound and disposed immediately adjacent said openings in said carriers when said carrier openings are directed downwardly, and means for driving said retaining conveyor.

References Cited

UNITED STATES PATENTS

| 865,645 | 9/1907 | Jennings | 99—364 |
| 1,154,611 | 9/1915 | Burpee | 99—365 XR |
| 1,389,447 | 8/1921 | Johnson | 99—361 |
| 1,397,985 | 11/1921 | Schmidt | 99—364 XR |
| 1,485,851 | 3/1924 | Hopper | 99—360 |
| 1,836,641 | 12/1931 | Brett | 99—361 XR |
| 2,353,805 | 7/1944 | Baker. | |
| 2,585,213 | 2/1952 | Baker | 99—362 XR |
| 2,782,708 | 2/1957 | Novotny | 99—365 |
| 3,020,825 | 2/1962 | Schmidt | 99—362 |
| 3,286,619 | 11/1966 | Lee | 99—362 |

WALTER A. SCHEEL, Primary Examiner

J. M. BELL, Assistant Examiner

U.S. Cl. X.R.

99—370